United States Patent
Krenz et al.

(10) Patent No.: US 11,304,152 B2
(45) Date of Patent: Apr. 12, 2022

(54) METHOD AND WIRELESS COMMUNICATION DEVICE FOR ENERGY-BASED TIME AVERAGING CONTROL FOR MANAGING RADIO FREQUENCY POWER

(71) Applicant: Motorola Mobility LLC, Chicago, IL (US)

(72) Inventors: Eric Krenz, Crystal Lake, IL (US); Mohammed Abdul-Gaffoor, Palatine, IL (US)

(73) Assignee: Motorola Mobility LLC, Chicago, IL (US)

(*) Notice: Subject to any disclaimer, the term of this patent is extended or adjusted under 35 U.S.C. 154(b) by 90 days.

(21) Appl. No.: 16/710,968

(22) Filed: Dec. 11, 2019

(65) Prior Publication Data

US 2021/0185621 A1    Jun. 17, 2021

(51) Int. Cl.
| H04W 52/30 | (2009.01) |
| H04W 24/08 | (2009.01) |
| H04W 72/04 | (2009.01) |
| H04W 52/36 | (2009.01) |
| H04W 52/22 | (2009.01) |
| H04W 52/14 | (2009.01) |
| H04W 88/02 | (2009.01) |

(52) U.S. Cl.
CPC ........... *H04W 52/30* (2013.01); *H04W 24/08* (2013.01); *H04W 72/0473* (2013.01)

(58) Field of Classification Search
None
See application file for complete search history.

(56) References Cited

U.S. PATENT DOCUMENTS

| 8,792,930 | B1* | 7/2014 | Gopalakrishnan .. | H04W 52/228 455/117 |
| 9,491,706 | B2* | 11/2016 | Thorson .............. | H04W 52/367 |
| 2012/0130660 | A1* | 5/2012 | Neumeyer ........... | G01R 31/392 702/63 |
| 2015/0087296 | A1* | 3/2015 | Kim .................. | H04W 72/0473 455/422.1 |
| 2019/0357239 | A1* | 11/2019 | Moon ................... | H04L 5/0094 |
| 2020/0213952 | A1* | 7/2020 | Wang .................... | H04W 72/14 |

OTHER PUBLICATIONS

Provisional application, Wang, U.S. Appl. No. 62/785,725, filed Dec. 28, 2018 (Year: 2018).*
Federal Communications Commission (FCC), Slide Deck from Oct. 2018 Telecommunication Certification (TCB) Workshop, "RF Exposure: Order/NPRM Issues", Technical Analysis Branch—Office of Engineering and Technology.

* cited by examiner

*Primary Examiner* — Jay L Vogel
(74) *Attorney, Agent, or Firm* — Loppnow & Chapa (57) ABSTRACT

The present application provides a method and a wireless communication device, which includes detecting one or more operating conditions of the wireless communication device, and determining a normalized energy relative to a monitored energy accumulation over time for each of one or more detected device operating conditions. An amount of already accumulated normalized energy for the detected device operating conditions is compared over an immediately prior window of time. An amount of allowed power to be used during a future sub-period of an upcoming window of time is computed, so as not to exceed an associated limit relative to the overall amount of allowed monitored energy accumulation in each current and upcoming window of time.

20 Claims, 5 Drawing Sheets

| INPUT PARAMETERS | | | | |
|---|---|---|---|---|
| | | dB/dBm | LINEAR | |
| | P MAX | 24.0 | 251.2 | mW |
| | P TARGET | 20.2 | 104.7 | mW |
| | T AVG | | 60.0 | s |
| | DX | 4.0 | 2.5 | |
| | D FB | 5.2 | 3.3 | |
| OUTPUT PARAMETERS | | | | |
| | | | | |
| | T P | | 60.0 | s |
| | T HI | | 20.0 | s |
| | T LO | | 40.0 | s |
| | P HI | 24.0 | dBm | |
| | P LO | 15.0 | dBm | |

METHOD AND WIRELESS COMMUNICATION DEVICE FOR ENERGY-BASED TIME AVERAGING CONTROL FOR MANAGING RADIO FREQUENCY POWER

FIELD OF THE APPLICATION

The present disclosure relates generally to managing radio frequency power in a wireless communication device, and more particularly, to computing an amount of allowed power to be used during a future sub-period for an upcoming window of time.

BACKGROUND

Presently, user equipment, such as wireless communication devices, communicate with other communication devices using wireless signals, such as within a network environment that can include one or more cells within which various communication connections with one or more networks and other devices operating within the network(s) can be supported. Network environments often involve one or more sets of standards, which each define various aspects of any communication connection being made when using the corresponding standard within the network environment. Examples of developing and/or existing standards include new radio access technology (NR), Long Term Evolution (LTE), Universal Mobile Telecommunications Service (UMTS), Global System for Mobile Communication (GSM), and/or Enhanced Data GSM Environment (EDGE).

Wireless communication devices by their very nature emit energy that can be detected outside of the device. Sometimes the emission of energy is purposeful and planned, and produces a desired result. In the same and/or other instances, the energy emitted may include spurious components and/or may have the potential to produce unintended interactions. A desired signal for some may be noise to others, and a balance needs to be struck between the anticipated benefits of sending out a wireless signal, while attempting to mitigate and/or avoid the potential for ill effects that could result. Correspondingly, at least some government regulators have stepped in to help define what is hoped to be reasonable standards of operation, recognizing that there are tradeoffs in most situations that need to be appropriately balanced. Furthermore, when a device emits energy into the overall environment, an external regulating body can sometimes help to better take into account the concerns of the public, in general, especially where there is uncertainty and possible disagreement as to the potential for possible ill effects. Presumably, the government can supply an unbiased view point, that can help provide appropriate guidance, and navigate the potential for differences of opinion.

In order to support greater data throughput, service providers have been increasingly looking at techniques which extend the available bandwidth that is allowed to be used by users within the system. Sometimes the potential impact that these new forms of signaling can have, can differ. As such, some types of operation and/or some types of signaling can produce different relative effects, and may need to take into account a variable impact to the surrounding environment.

The present inventors have recognized that it may be beneficial to determine a normalized energy in calculating the impact an emission might have to its immediate and/or nearby surroundings, that is intended to take into account the potential variability to the signals being emitted and the corresponding use conditions, so that any associated monitored energy accumulation over time can be better predicted and managed, and so as to meet the overall operational guidelines that are intended to help avoid and/or minimize the potential for concern.

SUMMARY

The present application provides a method in a wireless communication device. The method includes detecting one or more operating conditions of the wireless communication device, and determining a normalized energy relative to a monitored energy accumulation over time for each of one or more detected device operating conditions. An amount of already accumulated normalized energy for the detected device operating conditions is compared over an immediately prior window of time. An amount of allowed power to be used during a future sub-period of an upcoming window of time is computed, so as not to exceed an associated limit relative to the overall amount of allowed monitored energy accumulation in each current and upcoming window of time.

In at least one embodiment, the normalized energy is a conversion between a power level of the signal being transmitted by the wireless communication device, and an amount of monitored energy accumulation for each of the one or more detected device operating conditions.

The present application further provides a wireless communication device. The wireless communication device includes a transmitter, and a controller coupled to the transmitter. The controller includes an operating condition detection module, that detects an operating condition of the wireless communication device. The controller further includes a normalized energy determination module, where the normalized energy is determined relative to a monitored energy accumulation over time for each of one or more detected device operating conditions. The controller still further includes a comparison module, that compares an amount of already accumulated normalized energy for the detected device operating conditions over an immediately prior window of time, and an allowed power computation module, that computes the amount of allowed power to be used during a future sub-period of an upcoming window of time, so as not to exceed an associated limit relative to the overall amount of allowed monitored energy accumulation in each current and upcoming window of time.

These and other features, and advantages of the present disclosure are evident from the following description of one or more preferred embodiments, with reference to the accompanying drawings.

DETAILED DESCRIPTION OF THE PREFERRED EMBODIMENT(S)

While the present invention is susceptible of embodiment in various forms, there is shown in the drawings and will hereinafter be described presently preferred embodiments with the understanding that the present disclosure is to be considered an exemplification and is not intended to limit the invention to the specific embodiments illustrated. One skilled in the art will hopefully appreciate that the elements in the drawings are illustrated for simplicity and clarity and have not necessarily been drawn to scale. For example, the dimensions of some of the elements in the drawings may be exaggerated relative to other elements with the intent to help improve understanding of the aspects of the embodiments being illustrated and described.

Figure 1:
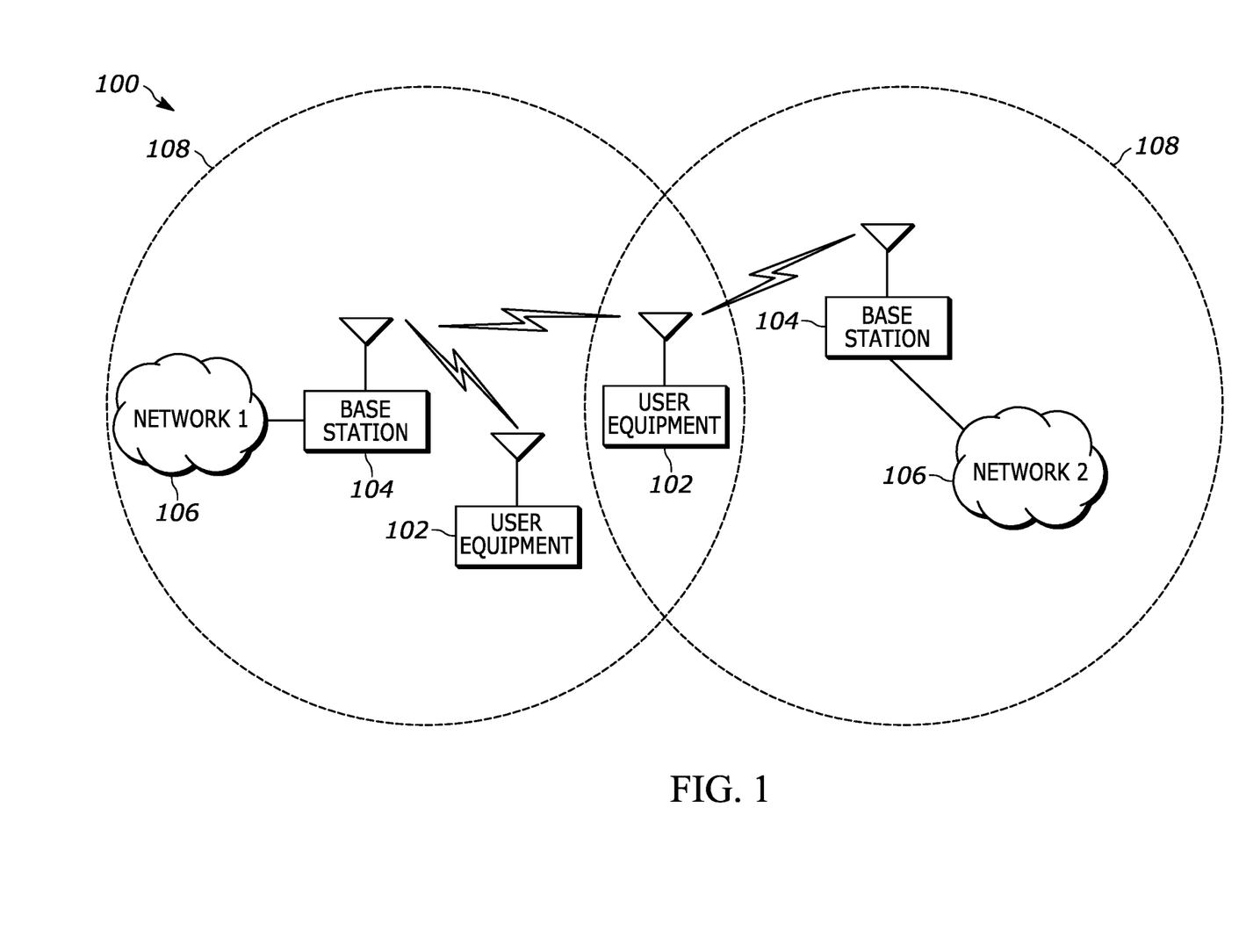
FIG. 1 is a block diagram of an exemplary network environment.

FIG. 1 illustrates a block diagram of an exemplary network environment 100. The exemplary network environment 100 can include one or more wireless communication devices, such as user equipment 102, which might communicate directly with one another, or via one or more networks, each having an associated network infrastructure. For example, the network infrastructure can include one or more base stations 104, which in turn are coupled to other network elements, which correspond to one or more networks, and which are generally represented as clouds labeled network 106. The various base stations 104 can be associated with the same network or can be separately associated with different networks.

A base station 104 will generally have an expected associated area 108 of coverage, which defines the area over which wireless radio frequency signaling from the base station can generally reach. While the strength of wireless radio frequency signaling is generally affected by the range of transmission, within an expected area of coverage, terrain and/or other physical elements can impact the ability of the signaling to be perceived at particular locations within the expected area 108 of coverage. Depending upon the reception capabilities of the user equipment 102, the current signal strength of the signal being transmitted at a particular location will affect whether a particular user equipment 102 can send or receive data with a particular base station 104. As such, some networks 106 will make use of multiple geographically spaced apart base stations 104, to provide communication capabilities across a larger geographical area.

It is further possible that different base stations 104 can be more directly associated with different networks 106, which may interact with one another at different parts of the respective networks. The network(s) 106 can include any type of network that is capable of conveying signals between different associated elements of the network including the one or more user equipment 102.

In some instances, the user equipment 102 is generally a wireless communication device that could take the form of a radio frequency cellular telephone. However, the user equipment 102 could also take the form of other types of devices that could support wireless communication capabilities. For example, the different potential types of user equipment can include a tablet, a laptop computer, a desktop computer, a netbook, a cordless telephone, a selective call receiver, a gaming device, a personal digital assistant, as well as any other type of wireless communication device that might be used to support wireless forms of communication.

The various networks 106, base stations 104 and user equipment 102 could be associated with one or more different communication standards. A few examples of different communication standards that a particular network 106 could support include Global System for Mobile Communications (GSM) Code Division Multiple Access (CDMA), Orthogonal Frequency Division Multiple Access (OFDMA), Long Term Evolution (LTE), New Radio Access Technology (NR), Global Positioning System (GPS), Wi-Fi (IEEE 802.11), as well as various other communication standards. It is possible that each network and/or associated element could support one or more different communication standards. It is also possible that different networks 106 can support one or more of the same standards.

In addition, the wireless communication devices 102, base stations 104 and networks 106 may utilize a number of additional various forms of communication and communication techniques including beamforming, signal diversity, and simultaneous voice and data that concurrently enables the use of simultaneous signal propagation. The wireless communication devices 102, base stations 104 and networks may further utilize carrier aggregation, and/or dual connectivity, which can include the simultaneous use of multiple adjacent carriers, that each can allow for the use of a different wireless communication technology, that is respectively used in conjunction with one or more communication networks.

Figure 2:
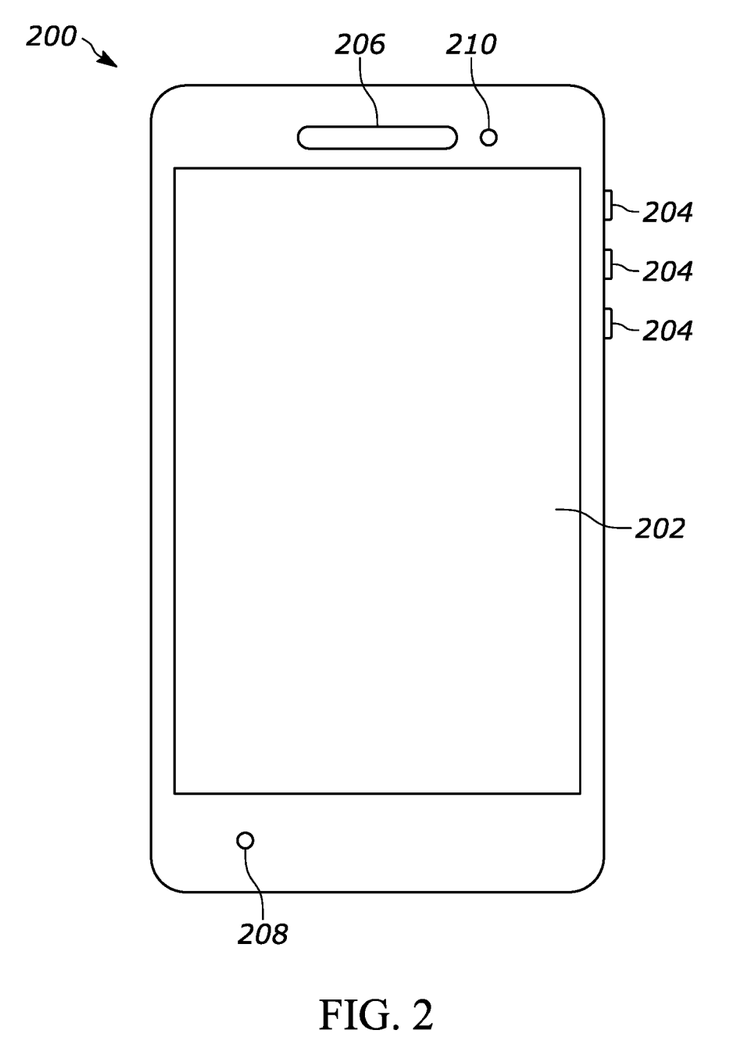
FIG. 2 is a front view of an exemplary user equipment in the form of a wireless communication device, such as a radio frequency radio telephone.

FIG. 2 illustrates a front view 200 of an exemplary user equipment 102 in the form of a wireless communication device, such as a radio frequency radio telephone. In the illustrated embodiment, the radio frequency cellular telephone includes a display 202 which covers a large portion of the front facing. In at least some instances, the display can incorporate a touch sensitive matrix, that can help facilitate the detection of one or more user inputs relative to at least some portions of the display, including an interaction with visual elements being presented to the user via the display 202. In some instances, the visual elements could include an object with which the user can interact. In other instances, the visual elements can form part of a visual representation of a keyboard including one or more virtual keys and/or one or more buttons with which the user can interact and/or select for a simulated actuation. In addition to one or more virtual user actuatable buttons or keys, the device can include one or more physical user actuatable buttons 204. In the particular embodiment illustrated, the device has three such buttons located along the right side of the device.

The exemplary wireless communication device, illustrated in FIG. 2, additionally includes a speaker 206 and a microphone 208 in support of voice communications. The speaker 206 may additionally support the reproduction of an audio signal, which could be a stand-alone signal, such as for use in the playing of music, or can be part of a multimedia presentation, such as for use in the playing of a movie, which might have at least an audio as well as a visual component. The speaker 206 may also include the capability to also produce a vibratory effect. However, in some instances, the purposeful production of vibrational effects may be associated with a separate element, not shown, which is internal to the device. Generally, the speaker 206 is located toward the top of the device, which corresponds to an orientation consistent with the respective portion of the device facing in an upward direction during usage in a portrait orientation in support of a voice communication. In such an instance, the speaker 206 might be intended to align with the ear of the user, and the microphone 208 might be intended to align with the mouth of the user. Also located near the top of the device, in the illustrated embodiment, is a front facing camera 210. The wireless communication device will also generally include one or more radio frequency transceivers, as well as associated transmit and receive circuitry, including one or more antennas that may be positioned internally relative to the device. In some instances, some or all of the antenna elements may also and/or alternatively be incorporated as part of the housing of the device.

The exemplary wireless communication device can further incorporate one or more controllers, which can help manage the overall operation of the device, including managing the overall operation of the wireless communication capabilities, including the management of radio frequency power using an energy based time averaging control system. More particularly, the present disclosure describes a control system that tracks the real-time normalized energy of one or more transmitters operating over the moving averaging time window, and updates the next time interval's power settings to maintain the normalized energy close to but not exceeding a predefined portion of an operating limit value. In at least some instances, it may be preferred to set as a target, and/or maintain as close to without exceeding a 100 percent of the operating limit value, which is sometimes referred to as having a value of one. The particular value of an operating limit value can be a function of the operating conditions of the wireless communication device, which can include the device's proximity to other nearby objects that might be exposed to at least some of the energy being radiated from the device for which accumulated energy exposure might be a concern.

The algorithm can employ a start-up period and a steady-state period with different update behaviors. In the start-up period, transmission may be limited to allow for an energy buffer to be available, so that the transmitter can better avoid instance for an upcoming time period in which it may be necessary for the transmitter to be disabled, so as to avoid exceeding the operating limit value. During the steady state mode, the energy is allowed to rise as close as possible to one to better support call performance. Decision logic chooses the maximum allowed power from the algorithm or the system-demanded power, whichever is less, at each instant in time (i.e interval and/or sub-period of the time window).

Rather than reducing radio frequency power in usage conditions where it may be desirable to lower radio frequency exposure, the transmitter can be duty-cycled between low and high power to enable meeting the exposure target limit values in a time-averaged sense. But the instantaneous power control for accomplishing this should account for averaging periods extending across transitions in operation of the radio, like handover, call drop and reestablishment, and so forth. It may be difficult to manage this without causing cases where the transmitter may need to be turned off entirely at times, causing potential link failure.

Calculating the Power Waveform for the Simple Periodic Case

In a use case where a power reduction may be needed in order to meet compliance targets, time-averaging permits meeting the requirement instead by duty cycling the transmit power between a high-power and a low-power state, rather than simply reducing the power continuously. If the average power of the duty-cycled transmitter, averaged over the allowed averaging period (currently 100 s for frequencies below 3 GHz, in the example of human exposure compliance, according to the Federal Communication Commission (FCC)), is equal to the continuous power that would just meet the compliance limit, then the device is compliant and the duty cycling has realized the necessary equivalent power reduction.

Hypothetically, any power reduction can be realized as an equivalent duty-cycled power waveform. For example, a 3 dB reduction in power vs. $P_{max}$ can be realized by transmitting at $P_{max}$ for 50 s and then turning off the transmitter for 50 s, or a 10 dB power reduction can be realized by transmitting at $P_{max}$ for 10 s and then turning off the transmitter for 90 s. However, two practical considerations place additional limitations on this duty-cycled power waveform:

1. It may be desired not to turn off the transmitter entirely at any time, since the link then might be lost. Hence, in at least some instances, a lower floor or fallback power value should be used for the low-power state, rather than an off state.
2. It may also be desired to apply a limit on how much the power during the high-power state should exceed the value of the continuous power that would meet the compliance requirement.

Hence, the calculation of the duty-cycled waveform for a given use case involving equivalent power reduction should take as input the following parameters:

$P_{max}$ the maximum power for the radiated state, without power reduction (this is the normal transmit power in the radiated state, and is usually limited by hardware capability).

$P_{target}$, the (reduced) power at which the device just meets the compliance target, on a continuous basis ($P_{max}-P_{target}$ in dB would typically be referred to as the required "cutback").

$T_{avg}$, the averaging period (currently 100 s for signals less than 3 GHz, or 60 s for signals between 3 GHz and 6 GHz per the FCC, as outlined in the Federal Communication Commission October 2018 Telecommunication Certification Body (TCB) Workshop).

$D_X$, delta-exceed factor, the factor by which the power during the high-power state is allowed to exceed the value of the continuous power $P_{target}$ that would meet the compliance requirement.

$D_{FB}$, delta-fallback factor, the fall-back power reduction factor, the factor by which the power in the low-power state in the waveform is allowed to be reduced relative to $P_{target}$.

From these base parameters, the transmit power waveform parameters can be calculated:

$P_{HI}$, the transmit power during the high-power part of the duty cycle;

$P_{LO}$, the transmit power during the low-power part of the duty cycle, i.e. the fallback power;

$T_{HI}$, the duration of the high-power part of the duty cycle; and $T_{LO}$, the duration of the low-power part of the duty cycle.

The relationships are as follows (all power expressions are linear not dB).

$$P_{HI}=\min[P_{max}, (P_{target}*D_X)] \quad (1)$$

$$P_{LO}=P_{target}/D_{FB} \quad (2)$$

$$P_{target}=(P_{HI}*T_{HI}+P_{LO}*T_{LO})/(T_{HI}+T_{LO})=P_{HI}*DC+P_{LO}*(1-DC),$$

where DC=the duty cycle=$T_{HI}/(T_{HI}+T_{LO})$

These equations can be solved for the duty cycle, DC.

$$DC=(P_{target}-P_{LO})/(P_{HI}-P_{LO}) \quad (3)$$

Then a value of $T_P=(T_{HI}+T_{LO}) \leq T_{avg}$ can be chosen, such that a desired $T_{HI}$ for more optimal network performance (for example) can be better achieved. In at least some instances, it may desired that $(T_{HI}+T_{Lo})$ be an integer sub-multiple of $T_{avg}$.

Figure 3:
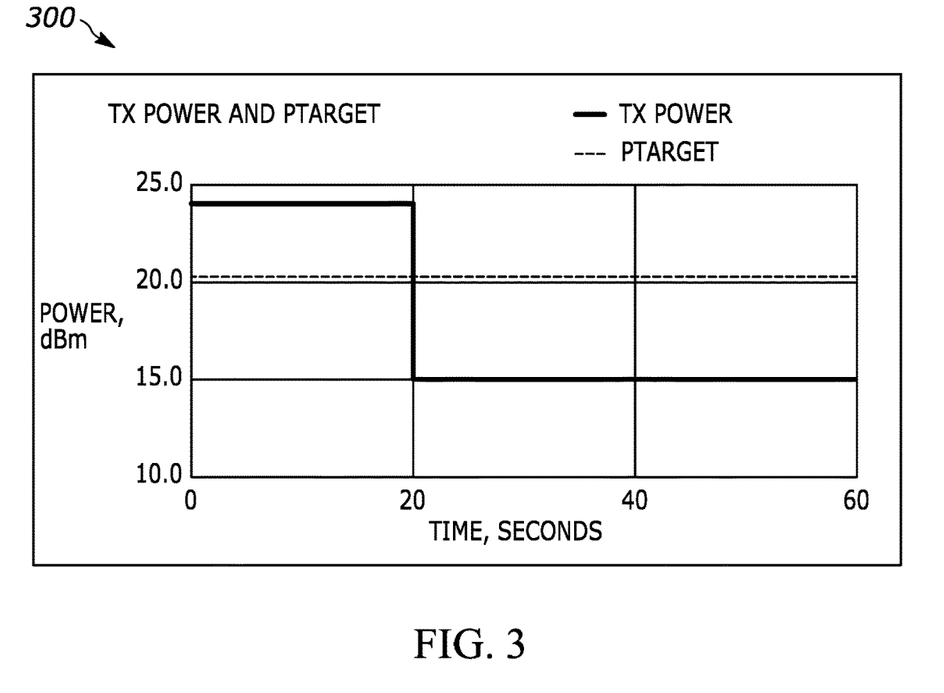
FIG. 3 is an example prototype waveform having a duty cycled transmit power.
Figure 4:
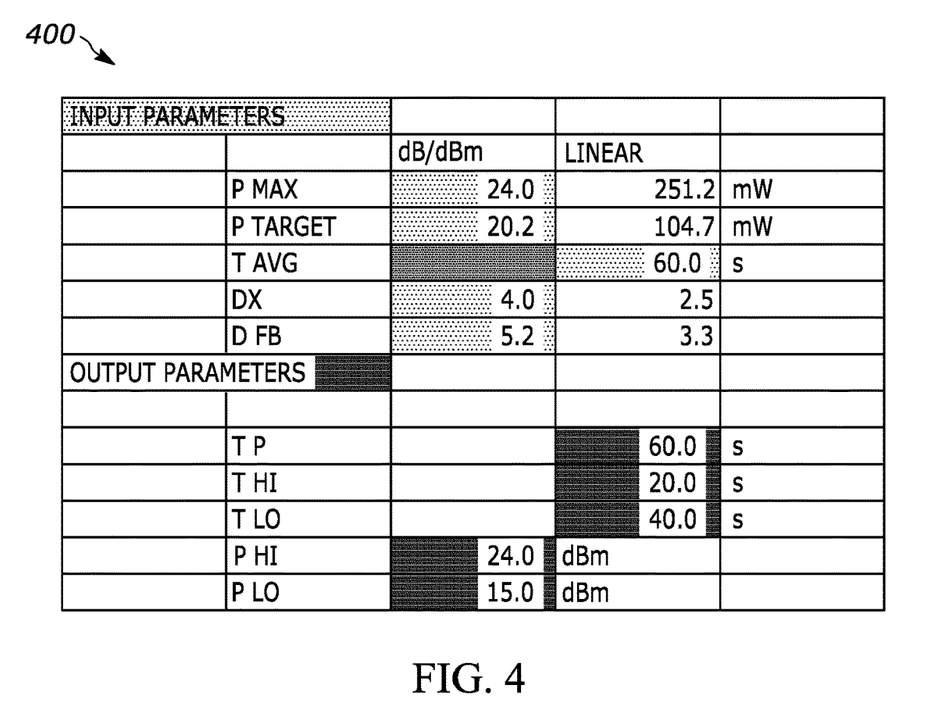
FIG. 4 is a table showing derived parameters for the example prototype waveform illustrated in FIG. 3.

An example prototype waveform 300 is shown in FIG. 3 along with its input and derived parameters shown in the table 400, illustrated in FIG. 4. Factors that may need to be taken into consideration when developing a prototype waveform, and its corresponding parameters include:

1. The averaged power may not exceed the $P_{target}$ over any 100 s/60 s averaging window, including transitions in device operating state, for example call dropped and re-established, handover, etc., and
2. Simultaneous TX cases should be handled to meet the averaging requirement.

Point 1 above may pose a distinct problem for the simple duty cycling scheme. If the periodic duty cycling is simply tied to the real-time clock, during a transition such as starting a new call or handover to a different frequency band of operation, the radio may be in a period where it is required to transmit at the low-power state. This could lead to an increase in call/handover failure rate. Furthermore, since different bands generally have different cutback requirements and hence different duty-cycling parameters, the simple power-cycling algorithm may not guarantee compliance over the averaging period that brackets a handover that changes band of operation.

To help overcome these concerns, a control scheme based on tracking energy, i.e. transmit power multiplied by time, may be beneficial. The algorithm tracks energy during the most recent averaging period, regardless of band that is transmitting.

For example, if only one band is transmitted throughout an averaging time period, the maximum energy that can be transmitted during the averaging period while maintaining compliance is that band's $P_{target}$ multiplied by $T_{avg}$. At any point in time, each band's actual transmit energy within the most recent averaging time window is the sum of energies (transmit powers multiplied by time transmitted), and can be written as follows.

$$E_{total} = \sum_{T_{avg}} E_{i,b} = \sum_{T_{avg}} P_{i,b} * T_{i,b}$$

This is the expression for the total energy transmitted in band b throughout the most recent averaging time window $T_{avg}$. Each time interval i of duration $T_{i,b}$ during which the band b was being transmitted within the averaging time window is included in the sum. The energy transmitted in each time interval, $E_{i,b}$, is the product of the transmit power during that interval, $P_{i,b}$, and the duration of the interval, $T_{i,b}$:

$$E_{i,b} = P_{i,b} * T_{i,b} \quad (4)$$

In a preferred embodiment, the powers $P_{i,b}$ would represent the actual instantaneous transmit powers of the mobile, as instructed by the network. However, for a simple implementation, the maximum allowed transmit power during each interval, as directed by the modem's power management algorithm, can be used as a conservative representation. The former is generally assumed for the remainder of this document, except in some embodiments discussed below where the alternative is identified.

The transmit energy in band b during a time interval i within the most recent averaging time window, $E_{i,b}$, can be normalized to that band's maximum transmit energy target for compliance over an entire averaging time period, $E_{target,b}$, as follows.

$$E_{norm,i,b} = \frac{E_{i,b}}{E_{target,b}} = \frac{E_{i,b}}{P_{target,b} * T_{avg}} \quad (5)$$

$P_{target,b}$ is the $P_{target}$ value for the band b.

If only band b is transmitted during the averaging time window, then the total normalized energy (summation of $E_{norm,i,b}$ over the averaging time window) should be maintained less than or equal to 1 for the device to remain compliant with the target value. If more than one band is (or has been) transmitted during the current averaging time window, the sum of all bands' normalized energies across all N time intervals in the averaging time period should be maintained less than or equal to 1, (please see below in the discussion describing the derivation of energy relationship):

$$E_{norm} = \Sigma_{i=1}^{N} E_{norm,i,b} \leq 1 \quad (6)$$

Hence, the algorithm may need to only continuously track a table of normalized energies (for the most recent averaging time window) for all bands, and keep their sum less than or equal to 1.

Proposed Power Management Algorithm, in-Modem

Overview:

For an implementation within the modem software, the algorithm tracks the actual transmitted power within each specified time interval within the averaging time window. Since the actual transmitter power setting may vary within the time interval, the modem may represent the interval either with the maximum power present in the interval, or the average power in the interval.

The algorithm calculates the allowable maximum power value for transmission in the upcoming time interval on a continuous scale. That is, it is not necessary to limit the in-modem implementation to choose from only a small finite number of maximum power setting values. The algorithm can calculate the desired maximum transmit power and direct the modem to use the nearest-but-lower calibrated power step to that calculated value.

The algorithm passes the calculated allowable maximum power value for transmission in the upcoming time interval (or its energy equivalent) to the modem at the start of the interval. The Modem then sets the actual transmit powers during the interval, for single or multiple simultaneous transmitters, so that the total power (or energy) does not exceed that value.

The modem is also taking direction from the network as to which transmit power setting to use at any instant in time. In each time interval, the maximum transmit power limit for the interval calculated by the power management algorithm is applied as a maximum ceiling value for the modem. In other words, the modem selects the lesser of the network-ordered power value and the power management algorithm-ordered power value. The modem may be receiving network power commands at a much faster rate than the update period of the time-averaging algorithm, and network power commands from LTE and NR networks may be asynchronous in time under the standard.

More Detailed Implementation:

One potential goal of the algorithm could be to maintain the normalized energy sum as close to 1 as possible, while not exceeding 1, and maintaining headroom as appropriate to reduce (preferably eliminate) the possibility that the transmitter may need to be turned off entirely during a time interval after some transition event.

The actual transmitted energy is not deterministic, since it depends on the uplink power requested by the network throughout the averaging time period. In many cases, the network may request significantly less transmit power than the power limit enforced for a given time interval by the time-averaging algorithm, or the transmitter may even be turned off for some portions of the interval. Hence the historical profile of the normalized energy during the averaging time window may be bursty. Because of this, it may be the case at times that there is little or no "old" energy that is about to expire out of the averaging window, leaving no new margin to continue transmitting (if the total normalized energy is already equal to 1), which may undesirably force the transmitter to be turned off to maintain compliance.

To help avoid this, the time-averaging algorithm may look ahead at the stored increments of normalized energy that will expire in the next several time intervals, and adjust its normalized energy target value (or other parameters) dynamically to maintain additional energy margin during intervals when little or no energy will expire out of the time averaging window. In this way, the probability of the time-averaging algorithm having to completely disable the transmitter during some interval can be made arbitrarily small.

Some parameters derived from the prototype waveform for each band can help to define how the time-averaging algorithm accomplishes this. The algorithm primarily utilizes the prototype waveform parameters of whichever of the current transmitters requires the largest equivalent power reduction to meet the standalone compliance target. This transmitter can be viewed as the one that would contribute the largest $E_{norm,i,b}$ during one interval transmitting at a given power setting. This is the transmitter which has the lowest value of $P_{target}$. For convenience, this transmitter will be referred to as the Highest-Energy Transmitter, HET, below.

We can define for each band b, the $E_{norm,i,b}$ during one interval transmitting at its highest power setting, $P_{HI}$, as that band's maximum normalized energy, $E_{norm,max,b}$, calculated as follows:

$$E_{norm,max,b} = \frac{P_{HI,b} * \delta t}{E_{target,b}} = \frac{P_{HI,b} * \delta t}{P_{target,b} * T_{avg}} \quad (7)$$

The parameters of the prototype waveform of the HET are used by the algorithm to set energy targets for the upcoming interval. When the energy margin allows, an energy of $E_{norm,max,HET}$, is transmitted in the upcoming interval (equivalent to transmitting the HET at $P_{HI}$). When transmit power needs to be reduced to maintain the required energy margin, the preference, in at least some embodiments, may be to still transmit a normalized energy corresponding to the fallback power, $P_{LO}$; this will be referred to as $E_{norm,FB,HET}$. These preferences can be met, then, if the expiring energy increment is at least as large as $E_{norm,FB,HET}$ (assuming in the worst case that the current total normalized energy in the averaging time window is 1). More generally, the time-averaging algorithm can meet its preferences by assuring that there is always headroom (combined expiring normalized energy and margin to total energy of 1) of at least $E_{norm,FB,HET}$.

Using these parameters, the time-averaging algorithm can look ahead to assess the expiring energy in the oldest K intervals that will remain in the new (upcoming) time-averaging window, which are stored in the normalized energy array for the current use case. If each of these K intervals contains at least $E_{norm,FB,HET}$, then, even if the normalized energy sum is maintained equal to 1, there will be margin in the next few intervals to transmit at least the fallback power. On the other hand, if these K soon-to-expire intervals each contain less than $E_{norm,FB,HET}$, then there may not be enough margin to maintain transmission in the next few intervals, if the energy sum is being maintained close to 1.

Hence, the basic algorithm is to sum the energy deficits, relative $E_{norm,FB,HET}$, in each of the K oldest intervals, and to deduct this deficit-sum from 1 to set the normalized energy target at each interval. Then the new permitted transmit energy for the upcoming interval is set to maintain the normalized energy at or below that target. The detailed ways in which the deficit is summed, and the energy target is filled, comprise specific implementations of the algorithm.

The value of K can be regarded as a tuning parameter for the algorithm. Making K large will decrease the probability of encountering a situation where the transmitter needs to be turned off for an interval, at the expense of maintaining the total normalized energy at a lower target than may be usually necessary. This means that the maximum transmit power would not be allowed as often. Conversely, a smaller value of K will permit transmitting at maximum power more often, but with higher risk of occasional intervals where the transmitter needs to be turned off (Note that it may be desired to have a unique value of K for each band and use case, depending on the required power reduction for each.)

In the general case of multiple simultaneous transmitters, the algorithm needs a way to prioritize which transmitter is allowed the lion share of the available energy budget in a given interval. This is usually driven by factors giving a desired network performance. A current exemplary embodiment involves 5G EN-DC (eUTRA-NR Dual Connectivity) operation, where an eUTRA (LTE, 4G) anchor channel is potentially transmitting at the same time as an NR (5G) data carrier. The anchor is the control channel, which supports and makes possible the operation of the 5G carrier. In at least some instances, it may be logical to prioritize the LTE anchor, since the entire connection will drop if the LTE anchor connection were to drop. Under dynamic power sharing in the 3GPP standard for EN-DC operation, this prioritization is reflected in the fact that the total power ordered by the network is allocated first to fill the requested LTE anchor power and only then, if margin remains, to fill the requested NR power.

At least one simpler way to allocate the energy budget for the current interval is to calculate the allowed maximum total power, for all transmitters, based on the power that would be allowed if only the Highest-Energy Transmitter (HET) were transmitting. In other words, calculate the total power from the available normalized energy using the target power of the HET as the normalizing factor:

$$E_{norm,t0,available} = \frac{E_{t0,available}}{P_{target,HET} * T_{avg}} = \frac{P_{total,t0,available} * \delta t_{t0}}{P_{target,HET} * T_{avg}}$$

leads to $$P_{total,t0,available} = \frac{E_{norm,t0,available} * P_{target,HET} * T_{avg}}{\delta t_{t0}}$$

where $P_{total,t0,available}$ is the allowed maximum total power for the upcoming interval $E_{norm,t0,available}$ is the available normalized energy for the upcoming interval, from the algorithm.

$P_{target,HET}$ is the limit power for the Highest-Energy Transmitter.

The algorithm then passes $P_{total,t0,available}$ to the modem to use as the limit on maximum total power to be transmitted any time an uplink power adjustment is made during the upcoming time interval, $\delta t_{t0}$. Since this power limit is calculated for the transmitter having the highest energy contribution, any actual combination of transmitters operating at power levels that add to less than or equal this limit will contribute a normalized energy that is less than or equal to the available energy budget for the interval. This assures conservatively meeting the compliance limit, but will result in more power reduction/duty cycling being effected than would be necessary, i.e. may be suboptimal for network performance. Note that this simpler power-allocation method becomes more precise for the standalone case where there is only one transmitter operating.

For this simpler power allocation method, the modem would require only a slight modification of its existing power selection scheme to utilize the $P_{total,t0,available}$ passed from the power management algorithm. For example, for EN-DC dynamic power sharing, the modem would choose the lesser of the network-directed total TX power and $P_{total,t0,available}$, and fill the LTE and NR powers accordingly.

Of course, the modem may make a more sophisticated division of the available total power, for example dividing it between NR and LTE in similar proportion to the NR and LTE requested powers from the network. Such modem optimizations can be considered alternate implementations of the present disclosure.

A better power-allocation method (from a network-performance point of view) may be for the algorithm to pass the available normalized energy for the upcoming interval to the modem, and for the modem then to use it to calculate the relevant powers for each transmitter at any time when an uplink power adjustment is made during the interval. At each time when an uplink power adjustment is to be made, the modem would assume that the requested combination of TX powers will be applied for the remaining duration of the interval, use these powers to calculate the rate of consumption of the remaining normalized energy balance, and scale down the total power (or one or another transmitter's power based on prioritization) to set the trajectory so the energy balance would just be consumed. This would require a calculation similar to the above one for the simpler power allocation method to be performed at every instant when the uplink power is being adjusted, which may present a computational or current drain load on the modem, that may exceed the current resources that are available.

Handling Multiple User Conditions:

Optionally, in some instances, it may be desirable to apply different time-averaging parameters per band for different user conditions that are detected through other means. For example, capacitive proximity sensors may be used to detect whether the device is operating in free space or near the user's body, and different parameters may be applied for each condition. In this way, unnecessary power limiting/duty cycling may be avoided. For whatever the current User Condition (UC), the normalized energy sum should contain all the energy contributions that occurred during that user condition, over the previous $T_{avg}$ averaging period. Since the user may switch user conditions multiple times during the averaging period, energy sums for each user condition may be tracked independently. In this way, the compliance limit is conservatively met for whatever the current operating condition is, at all times. To accomplish this, the time-averaging algorithm can maintain, in memory, an array of the past incremental normalized energy contributions for each interval of the past $T_{avg}$ averaging period, for each (pre-defined) user condition. The current normalized energy calculation is calculated by summing the array corresponding to the current user condition.

To support this more generalized operation, the time-averaging algorithm maintains in memory an array of the previous N recorded incremental normalized energies $E_{norm,i,UC}$ for each User Condition, where N is the number of intervals $\delta t$ in the time averaging window $T_{avg}$.

$$N = T_{avg}/\delta t$$

For exemplary values of $T_{avg}=60$ s and $\delta t=1$ s, N=60. If there are M predefined User Conditions, the M energy arrays will be of a form $$\overline{E_{norm,UC}} = [E_{norm,-N,UC} \ldots E_{norm,i,UC} \ldots E_{norm,-1,UC}]$$

$E_{norm, i, UC}$ is the normalized energy transmitted in interval i, in User Condition UC, with i ranging from $-N$ to $-1$, and UC ranging from 1 to M. At the current point in time, t0, $E_{norm, -1, UC}$ is the normalized energy that was transmitted in the most recent interval (just ending interval), and $E_{norm, -N, UC}$ is the oldest increment of normalized energy that is still included in the averaging window. $E_{norm, -N, UC}$ is the energy increment that will expire out of the averaging window at the next evaluation point, when the currently upcoming time interval completes.

SUMMARY

The present disclosure consists of a time-averaging algorithm part and a modem software part. Either or both parts may run in the modem processor, or in some other processing unit communicating with the modem.

The time-averaging algorithm tracks the total transmit power of all transmitters over the most recent $T_{avg}$ averaging time window, for the current User Condition, and utilizes the normalized energy summation based on this data to periodically (for example, approx. 1 s intervals) pass an allowable maximum normalized energy limit for the next interval to the modem software, such that the normalized energy for any averaging time window always remains less than or equal to 1, assuring compliance to the underlying exposure target.

The modem software part accepts the periodic allowable normalized energy target (or its power equivalent) from the time-averaging algorithm, and applies it to each uplink power adjustment request during the next time interval to limit the total transmit power as needed to keep the normalized energy for the interval less than the allowable normalized energy limit. The modem software part also tracks the actual transmit power in each band during each interval, and passes this data per interval back up to the time-averaging algorithm for its use in tracking total transmit power over the averaging time window.

The time-averaging algorithm can utilize the following aspects to accomplish its task:
1. Each potential transmit band is parameterized by its maximum power in radiated mode and its target power, corresponding to the power at which it would meet the compliance target in standalone mode.
2. For each potential transmit band, an underlying prototype waveform is calculated, of a simple square-wave duty-cycled waveform that would allow the compliance target to be met in an average sense for that band. This waveform is not necessarily used directly, but is used to calculate the parameters like $E_{norm,max,b}$ for each band. (Alternately, these parameters can be calculated directly without explicitly constructing the prototype waveform.)

3. The algorithm tracks the current sum of normalized energy over the averaging time window by applying the parameters in 1 to the actual transmit power samples periodically supplied by the modem software, as described above. The calculated normalized energies per increment are stored in the appropriate User Condition array.

4. At the start of each interval, the algorithm calculates a limit for the allowable maximum energy that can be transmitted in that upcoming interval.
   a. The algorithm calculates the normalized energy deficit, relative $E_{norm,FB,HET}$ of the current Highest Energy Transmitter, in each of the oldest K entries of the current User Condition's normalized energy array, as it would stand at the end of the upcoming interval. These are the samples in the energy array, at the start of the interval, from index i=−N+1 to i=−N+K. The sum of these K deficits is denoted as $E_{norm,deficit}$.
   b. For the allowed energy calculation for the upcoming interval, the Soft Target for total normalized energy is defined as $1-E_{norm,deficit}$. The Hard Target is defined as 1 for all intervals. As an optional tuning parameter, some additional energy margin can be built into the Soft and Hard energy targets by reducing 1 in both expressions to a lesser value, for example 0.95. This will further reduce the likelihood of having to blank the transmitter, at the expense of reducing the likelihood of being able to use maximum transmit power.
   c. The algorithm determines the allowable energy for the upcoming summing previous energy in the array with interval, $E_{norm,t0,available}$, by candidate new energies for the upcoming interval:
      i. If applying $E_{norm,max,HET}$ in the upcoming interval would result in a new normalized energy sum not exceeding the Soft Target, then the available energy for the upcoming interval, $E_{norm,t0,available}$, is set equal to $E_{norm,max,HET}$.
      ii. Otherwise, if applying $E_{norm,FB,HET}$ in the upcoming interval would result in a new normalized energy sum not exceeding the Hard Target, then the available energy for the upcoming interval, $E_{norm,t0,available}$, is set equal to $E_{norm,FB,HET}$.
      iii. Otherwise, the available energy for the upcoming interval, $E_{norm,t0,available}$, is set equal to 0.

5. At the start of each interval, the algorithm passes the calculated energy limit or its power equivalent to the modem software, to use to control the TX power to stay within the limit. Depending on the choice of implementation in the modem software, this may take one of two forms:
   a. In the preferred simple scheme, the algorithm converts the available normalized energy limit to an equivalent power limit using the target power parameter of the HET.
   b. In the more complex scheme, the algorithm just passes the available normalized energy limit to the modem software.

6. The algorithm may perform all of the above steps using distinct band parameterization as in step 1, for each of multiple user cases (like free space operation, operation in a talk mode at the head, operation on the torso), as determined by other means on the device like a proximity sensor.

The modem software part utilizes the following aspects to accomplish its task:
1. At the start of each interval, it accepts the available normalized energy limit for the interval from the time-averaging algorithm, and uses it for the interval whenever an uplink power adjustment is requested (e.g. by the network), to limit power as needed to keep within the available normalized energy limit:
   a. In the at least one exemplary simpler scheme, the equivalent power limit passed from the time-averaging algorithm is applied to any uplink power adjustment decision as a limit on total transmit power. Generally, it means that total TX power is chosen as the lesser of the default calculation (e.g. based on 3GPP standard) or the equivalent power limit passed from the time-averaging algorithm part.
   b. In a more complex scheme, the modem software may accept the available normalized energy limit from the time-averaging window at the beginning of each interval, and use it at each uplink power change request to calculate TX powers such that the available energy would just be consumed in the interval. The modem should use the per-band target power parameterization from part 1 in the time-averaging algorithm description to perform these calculations.
   c. For either of the above, the start of a new interval is also considered as an uplink power change request.

2. During each interval, the modem software part tracks and stores at each instant in time the actual transmit powers for each band being transmitted. This data is stored on a periodicity much shorter than the interval, for example every ms during a is interval; or it is tracked based on each time that the uplink power is changed. In the preferred embodiment, the modem software then calculates the average transmitted power for each band over the entire interval, and passes the band and average power data back to the time-averaging algorithm at the end of the interval. It is also acceptable (conservative from a compliance perspective but suboptimal from a network performance perspective) to simply track the maximum power transmitted during the interval in each band, and pass that information to the time-averaging algorithm.

Initialization: At design time, the following parameters are stored in the device for use by the time-averaging algorithm:

Global Parameters:

$T_{avg}$, the averaging period (representationally 60 s for operation up to 6 GHz); and δt, the update interval (representationally 1 s, and should be integer sub-multiple of $T_{avg}$).

The derived input $N=T_{avg}/δt$ is calculated from these parameters.

For each band, b, and in each of the 1 through M User Conditions, these band-specific parameters are input:

$P_{max}$ the maximum power for the radiated state, without power reduction (this is the normal TX power in the radiated state);

$P_{target}$, the (reduced) power at which the device just meets the compliance target, on a continuous basis ($P_{max}-P_{target}$ would typically be referred to as the required "cutback");

$D_X$, delta-exceed factor, the factor by which the power during the high-power state is allowed to exceed the value of the continuous power $P_{target}$ that would meet the compliance requirement; and $D_{FB}$, delta-fallback factor, the fall-back power reduction factor, the factor by which the power in the low-power state in the waveform is allowed to be reduced relative to $P_{target}$.

From these, the derived quantities below are calculated for use by the algorithm:

$P_{HI,b}$, the transmit power during the high-power part of the prototype duty cycle waveform;

$P_{LO,b}$, the transmit power during the low-power part of the duty cycle, i.e. the fallback power;

$E_{norm,max,b}$, the normalized energy per interval when transmitting at $P_{HI,b}$; and $E_{norm,FB,b}$, the normalized energy per interval when transmitting at $P_{LO,b}$.

These parameters are calculated at design-time as described in preceding sections.

Derivation of Energy Relationship

The general expression for time-averaged specific absorption rate (SAR) is $$SAR_{avg} = \frac{1}{T_{avg}} * \int_{t_0-T_{avg}}^{t_0} SAR(t)dt$$

Where $t_0$ is the current instant in time, and SAR(t) is the time-varying record of SAR over the integration time (averaging time window).

For the case of interest here, the integration time consists of a finite number N of discrete time intervals, within each of which transmission in a given band b is occurring at a fixed, constant, power level, where more generally, the transmit (TX) power may in fact be varying within the time interval, but it is limited during the interval to a fixed maximum power, which is what is considered in the analysis. In the more general case involving the finite number of discrete time intervals, the analysis here gives a conservative result for time-average SAR. In this case, the integration can be rewritten as a discrete summation:

$$SAR_{avg} = \frac{1}{T_{avg}} * \sum_{i=1}^{N} SAR_b * T_{i,b}$$

Where b identifies the band transmitting during time interval i sequentially during the averaging period, $SAR_b$ is the (constant) SAR during that time interval, and $T_{i,b}$ is the duration of that time interval. The analysis also applies for cases of simultaneous transmission. Each transmitting band and its transmit time would be included in the sum. The sum of individual time intervals may exceed the averaging time in this case, where time intervals may overlap arbitrarily. The summation produces a conservative result, by assuming all bands' peak SAR regions overlap, and maintaining this sum within the limit; where different bands' SAR peaks do not overlap, actual SAR will be lower than the summation.

$SAR_b$ can be rewritten as a function of the SAR compliance limit (or internal/conservative target value), $SAR_{target}$, and the ratio of TX power during the interval to the respective band's target power:

$$SAR_b = SAR_{target} * \frac{P_{i,b}}{P_{target,b}}$$

Where $P_{i,b}$ is the transmit power of band b during that interval and $P_{target, b}$ is the $P_{target}$ value for the band b.

The discrete summation then becomes $$SAR_{avg} = \frac{SAR_{target}}{T_{avg}} * \sum_{i=1}^{N} \frac{P_{i,b}}{P_{target,b}} * T_{i,b} = SAR_{target} * \sum_{i=1}^{N} \frac{P_{i,b} * T_{i,b}}{P_{target,b} * T_{avg}}$$

The power-multiplied-by-time terms can be defined as energy terms. $E_{i,b}=P_{i,b}*T_{i,b}$ is defined as the energy transmitted in the band b during the interval i. $E_{target,b}=P_{target,b}*T_{avg}$ is defined as the target energy for band b; if only band b were transmitted during the entire averaging time period $T_{avg}$. The compliance target would be just met if a total energy of $E_{target,b}$ were transmitted. Note that the $E_{target,b}$ is a characteristic of the device design for each band.

The fraction within the summation can then be recognized as the normalized energy of the transmission interval i, that is, the ratio of the actual transmit energy in the interval to the limit that could be transmitted in the relevant band for an entire averaging period:

$$E_{norm,i,b} = \frac{E_{i,b}}{E_{target,b}} = \frac{P_{i,b} * T_{i,b}}{P_{target,b} * T_{avg}}$$

Thus, the time-average SAR can be expressed as the sum of the normalized energies in each interval and band as $$SAR_{avg} = SAR_{target} * \sum_{i=1}^{N} E_{norm,i,b}$$

A device is compliant in a given time-averaging period if the time-average SAR is less than or equal to the SAR limit or target value. Substituting into the above equation for $SAR_{avg}$, we have $$SAR_{avg} = SAR_{target} * \sum_{i=1}^{N} E_{norm,i,b} \leq SAR_{target}$$

And thus the limit is met within the time-averaging period if $$\sum_{i=1}^{N} E_{norm,i,b} \leq 1$$

Simplified Algorithm without Tracking Actual TX Power

In accordance with at least some further embodiments, it may not be possible to track the actual power transmitted per band. However, it may still be possible to apply a time-averaging approach to compliance management, by making a conservative assumption that the maximum transmit power allowed by the algorithm is always actually transmitted. In other words, the algorithm tracks its previously ordered maximum transmit power instead of tracking the actual power transmitted by the modem. This is conservative, in that the actual power/exposure will always be less than or equal to the assumed power/exposure (i.e. the ordered maximum transmit power).

The disadvantage of this approach is that it will result in more unnecessary power reduction/duty cycling of the transmitter than would be required for compliance purposes.

The above algorithm can be used in its entirety for this simplified case, except that the M energy arrays (tracking energy for each use case) are populated with the ordered allowable energy for the previous interval, $E_{norm,t0,available}$, rather than the energy based on the actual transmit power(s), as would be tracked by the modem in the above full algorithm.

Because the worst-case (maximum) transmit power is assumed to have been used, in this algorithm, the energy arrays will tend to be more "full" than in the algorithm where actual transmit power is tracked. This is because actual transmitter activity on the network is likely to be bursty in nature. Consequently, the algorithm tuning parameter, K, will likely need to be set to a higher value, to minimize the likelihood of the transmitter needing to be disabled due to no energy headroom. Setting K equivalent to the duration of $T_{LO}$ will help assure that the transmitter will not need to be disabled. In practice, it appears that K can be set to a lower value close to this while still maintaining a very low probability of having to blank the transmitter. In comparison, for the full algorithm elaborated above (where the actual transmit power is tracked), it is observed empirically that K can be set to a very small value compared to $T_{LO}$.

A few modifications may be added to the simplified algorithm without power tracking, to reduce the incidence of unnecessary power reduction/duty cycling. The first of these is for the algorithm to monitor a simple flag from the modem, that indicates whether or not the modem is in a state where it may be transmitting. This is simple, slow, information from the modem (e.g., "ServiceStateChange" message), that does not track the actual transmit power. During any time period when this information indicates that the modem could not be transmitting, the time-averaging algorithm can populate the relevant energy array with 0 instead of the allowable energy for the interval, thus leaving more energy headroom for future transmissions.

Another modification is to split the time-averaging algorithm's operation into Start-Up Mode and Steady-State Mode, based on duration of time since the most recent "Start-Up Event" (e.g. beginning of a period of possible transmission, change of channel, or any other change or potential change in transmitter configuration). The algorithm would be in Start-Up Mode during the first $T_{avg}$ seconds (N intervals) after a Start-Up Event, and in Steady-State Mode afterwards until the next Start-Up Event. During Start-Up Mode, the parameters of the algorithm, may be set to different values than during Steady-State, to reduce the likelihood of having to blank the transmitter. For example, in Start-Up Mode, a larger value of K (closer to correspondence with $T_{LO}$) may be used, and then a lower K value used during Steady-State Mode. Alternately, the algorithm itself may be different during Start-Up Mode, for example it may be biased to produce the simple underlying prototype waveform during Start-Up Mode.

Simplified Algorithm without Tracking Actual TX Power and Without Memory

In accordance with at least some still further embodiments, a time-averaging algorithm that requires neither tracking of actual power or memory of previously ordered transmit power during the averaging time period is provided. It is based on direct application of the prototype waveform on a continuous basis.

From equation 1, $P_{HI}$ is defined as $$P_{HI} = \min[P_{max}, (P_{target} * D_X)]$$

$P_{target} * D_X$ is the power that would be allowed to be transmitted during the high-power portion of the waveform, if meeting the compliance limit were the only limitation. $P_{HI}$ is further limited by $P_{max}$ only because $P_{max}$ is the maximum power that the hardware is capable of delivering. If we consider $P_{HI}$ to be defined strictly as the maximum allowed power for the current interval that is output from the time-averaging algorithm to the modem (regardless whether the modem and HW are able to generate that power), then we can define $P_{HI}$ as $$P_{HI} = P_{target} * D_X \tag{AB1}$$

In other words, for the band in question, $P_{HI}$ is the value passed from the time-averaging algorithm to the modem, but the modem sets the transmit power to at most $P_{HI}$ but possibly the lesser value $P_{max}$, depending on the hardware capability in that band. Hence, the power averaged over the time averaging window with the prototype waveform will be less than or equal to $P_{target}$, thus assuring that compliance to the exposure requirement is maintained.

In this case, the Duty Cycle, DC, can be written strictly as a function of the delta-exceed factor, $D_X$, and the delta-fallback factor, $D_{FB}$. Substituting equations 2 and AB1 into equation 3:

$$DC = \frac{P_{target} - P_{LO}}{P_{HI} - P_{LO}} = \frac{P_{target} - P_{target}/D_{FB}}{P_{target} * D_X - P_{target}/D_{FB}} \tag{AB2}$$

$$DC = \frac{D_{FB} - 1}{D_{FB} * D_X - 1}$$

Furthermore, the normalized energy per increment (e.g. equations 4, 5, and 7) during the high-power and low-power portions of the prototype waveform are respectively $$E_{norm,max} = \frac{P_{HI} * \delta t}{E_{target}} = \frac{P_{HI} * \delta t}{P_{target} * T_{avg}} = \frac{P_{target} * D_X * \delta t}{P_{target} * T_{avg}} = \frac{D_X * \delta t}{T_{avg}} = \frac{D_X}{N} \tag{AB3}$$

$$E_{norm,FB} = \frac{P_{LO} * \delta t}{E_{target}} = \frac{P_{LO} * \delta t}{P_{target} * T_{avg}} = \frac{P_{target}/D_{FB} * \delta t}{P_{target} * T_{avg}} = \frac{\delta t}{D_{FB} * T_{avg}} = \frac{1}{D_{FB} * N} \tag{AB4}$$

If all bands have the same delta-exceed factor, $D_X$, and the same delta-fallback factor, $D_{FB}$, then the Duty Cycle, DC, and the normalized energies per increment in each part of the prototype waveform are the same for all bands. The prototype waveform for each band differs only in the actual values of $P_{HI}$ and $P_{LO}$ that are applied in that band. That is, the same prototype normalized energy waveform is applicable in all bands, and only when converted to a power waveform for the current band will it be shifted and scaled for that band's particular $P_{target}$ to yield the power waveform for that band.

In this way it is possible to simply apply the prototype normalized energy waveform on a continuous, repeating basis, without any need of storing the previously ordered maximum energy samples. In other words, the time-averaging algorithm simply repeats the prototype normalized energy waveform according to the wall clock. For whatever band is currently transmitting, the allowed normalized energy for the current interval is converted to the appropriate power for that band according to the band's $P_{target}$ value. Because all bands have the same normalized energy per increment contribution for each part of the waveform, time-averaged compliance is assured as the band is changed, etc.

For the simultaneous/EN-DC case, the energy value from the prototype energy waveform is converted to the maximum allowed total power for the modem to apply (to dynamic power sharing), using the $P_{target}$ value of the HET, as described in previous sections.

The values of $D_X$ and $D_{FB}$ need to be chosen to support the band with the highest cutback requirement for the user case. (Different values can be chosen for each different use case, since averaging applies on a per-use-case basis.) One strategy would be to set $D_X$ equal to the required cutback ratio for that band. In this case, $P_{HI}$ would equal $P_{max}$. Selecting $D_{FB}$ then defines DC. Alternately, if a smaller value of $D_X$ is selected, $P_{HI}$ would be a value lower than $P_{max}$. Again, selecting $D_{FB}$ then defines DC. In this case, full $P_{max}$ should never be applied in this band and use-case (i.e., it's equivalent to a partial fixed cutback together with additional equivalent cutback via duty cycling). This can be used as an optimization parameter to allow other, lower-energy, bands to avoid having as much of a duty-cycling penalty.

An example prototype energy waveform can be written as $$E_{proto}(n) = \{E_{norm,max} \text{ if } n \leq N^* T_{HI}/T_{avg}\, E_{norm,FB} \text{ if } n > N^* T_{HI}/T_{avg}\}$$

Where n ranging from 1 to N is the increment index, and the function is defined over this range. This example would yield the simple square waveform as shown in the introductory section.

Then if the wall-clock time is represented simply as the index j (using the same time increment discretization δt), the allowed normalized energy for each interval represented by j can be written as $$E_{norm,t0,available}(j) = E_{proto}(j \text{ modulo } N)$$

Figure 5:
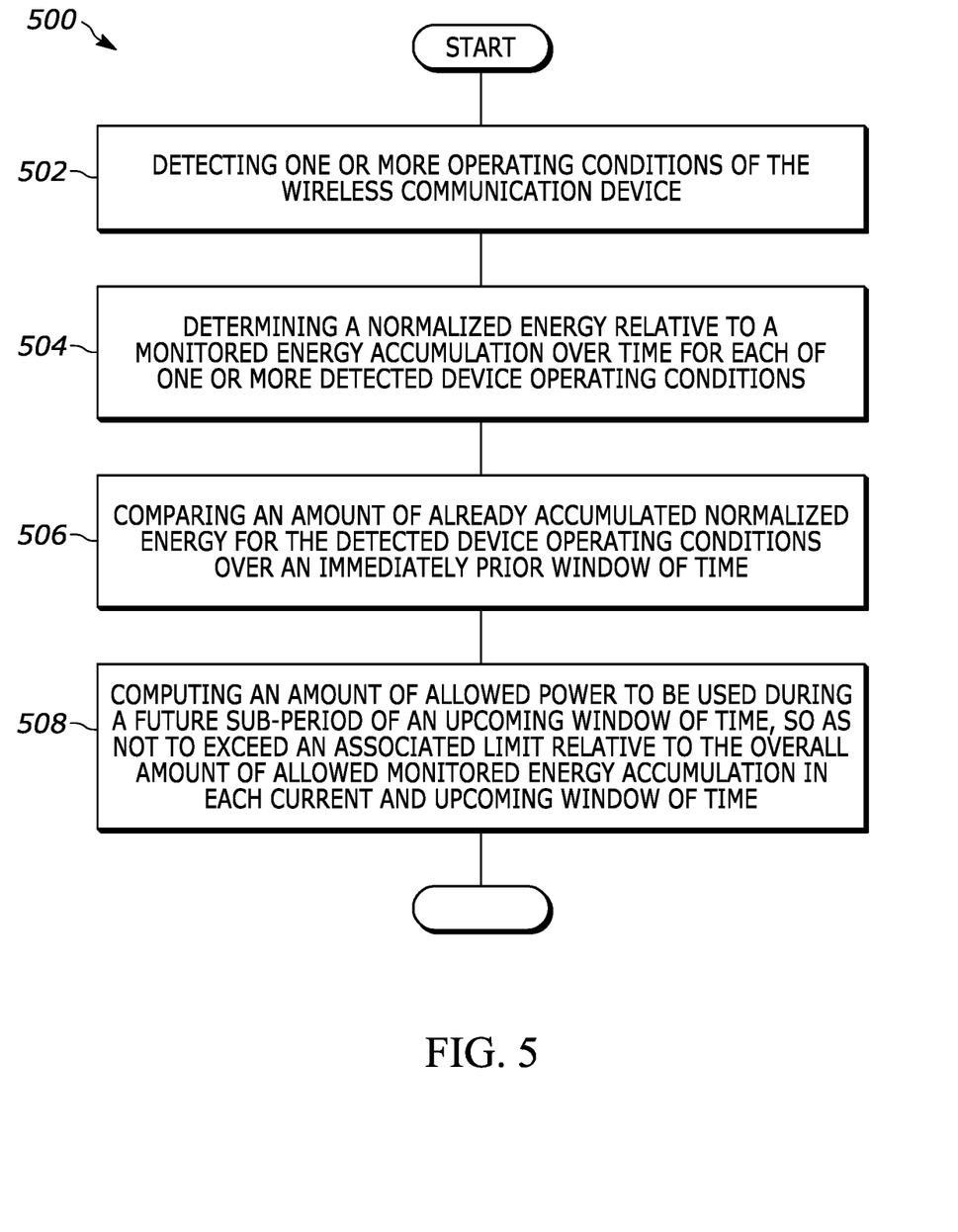
FIG. 5 is a flow diagram of a method for managing radio frequency power using an energy based time averaging control system.

FIG. 5 illustrates a flow diagram 500 of a method for managing radio frequency power for energy-based time averaging control. The management of radio frequency power as outlined in the illustrated flow diagram could be implemented in support of the wireless communication capabilities of the device. In at least the illustrated embodiment, the method includes detecting 502 one or more operating conditions of the wireless communication device, and determining (504) a normalized energy relative to a monitored energy accumulation over time for each of one or more detected device operating conditions. An amount of already accumulated normalized energy for the detected device operating conditions is compared (506) over an immediately prior window of time, and an amount of allowed power to be used during a future sub-period of an upcoming window of time is computed (508), so as not to exceed an associated limit relative to the overall amount of allowed monitored energy accumulation in each current and upcoming window of time.

In some instances, the monitored energy accumulation is associated with a signal being transmitted by the wireless communication device. In some of these instances, the monitored energy accumulation can correspond to the heat produced in signal transmission circuitry of the wireless communication device. In other of these instances, the monitored energy accumulation can correspond to energy associated with the signal being transmitted by the wireless communication device being absorbed into a nearby body.

In some instances, the normalized energy can be a conversion between a power level of the signal being transmitted by the wireless communication device, and an amount of monitored energy accumulation for each of the one or more detected device operating conditions. In some of these instances, the normalized energy for at least some of the detected device operating conditions might be determined as part of a pre-computed modeled effect. In other of these instances, the normalized energy for at least some of the detected device operating conditions might include a historically determined measured effect relative to each of the type of signal being transmitted during a particular type of operating condition.

In some instances, the window of time can have a duration, which is dependent upon the operating condition of the wireless communication device. In some of these instances, the duration of the window of time might be dependent upon a frequency of a source of energy responsible for the monitored energy accumulation, wherein the frequency of the source of energy responsible for the monitored energy accumulation being below a predetermined threshold results in a time window having a duration, which is relatively longer, and wherein the frequency of the source of energy responsible for the monitored energy accumulation being above a predetermined threshold results in a time window having a duration, which is relatively shorter. Where the source of energy responsible for the monitored energy accumulation includes multiple component sources each having a different frequency, and where when at least one of the respective different frequencies of the multiple component sources is above the predetermined threshold and at least one of the respective different frequencies is below the predetermined threshold, the time window having the shorter duration can be used.

In some instances, the computed amount of allowed power can have a different value between at least some of multiple different sub-periods of a particular one of the windows of time.

As part of computing an amount of allowed energy to be used during a future sub-period of an upcoming window of time, an anticipated low energy value can be set to a value that corresponds to an amount of power for minimally maintaining an existing connection. As part of computing an amount of allowed energy to be used during a future sub-period of an upcoming window of time, an anticipated high energy value can be set to a value that corresponds to an amount of power for a desired portion of the time window to exceed the anticipated low power value without the accumulated normalized energy over an immediately prior window of operation exceeding an allowed limit. When an amount of available energy to be allocated to a future sub-period without exceeding the allowed limit for a new immediately prior window of operation, which includes the future sub-period, is less than the low energy value that corresponds to an amount of power for minimally maintaining an existing connection, the amount of available energy to be allocated to the future sub-period can be set to zero.

In some instances, an amount of energy used in the further sub-period of the upcoming window of time can correspond to the lesser of the computed amount of allowed energy and the amount of energy corresponding to an amount of power, which is desired by the corresponding operation of the device. In some of these instances, for each of the sub-periods of the immediately prior window of time, the wireless communication device can maintain a record of power. In some instances, the record of power for each of the sub-periods can correspond to the amount of power used. In some instances, the record of power for each of the sub-periods can correspond to the computed amount of allowed power.

During an initial period of operation in a corresponding mode, prior to having an operation history in the corresponding mode of a duration of at least determined desired window of time, in computing the amount of allowed power to be used during a future sub-period, an amount may be reserved so as to allow for a future sub-period to have available an anticipated low power value amount for minimally maintaining an existing connection during the future sub-period.

In some instances, computing the amount of allowed power to be used during the future sub-period of the upcoming window of time can use a predefined prototype waveform, which is tracked using the determined normalized energy based on a presently detected one of the one or more operating conditions. In some of these instances, the determined normalized energy will translate to respective power levels that can shift due to differences in the corresponding power to normalized energy translation for each of the one or more detected device operating conditions, where the relative relationship between a target energy value, an anticipated low energy value and an anticipated high energy value is the same for each similar type of user interaction with the wireless communication device.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 6:
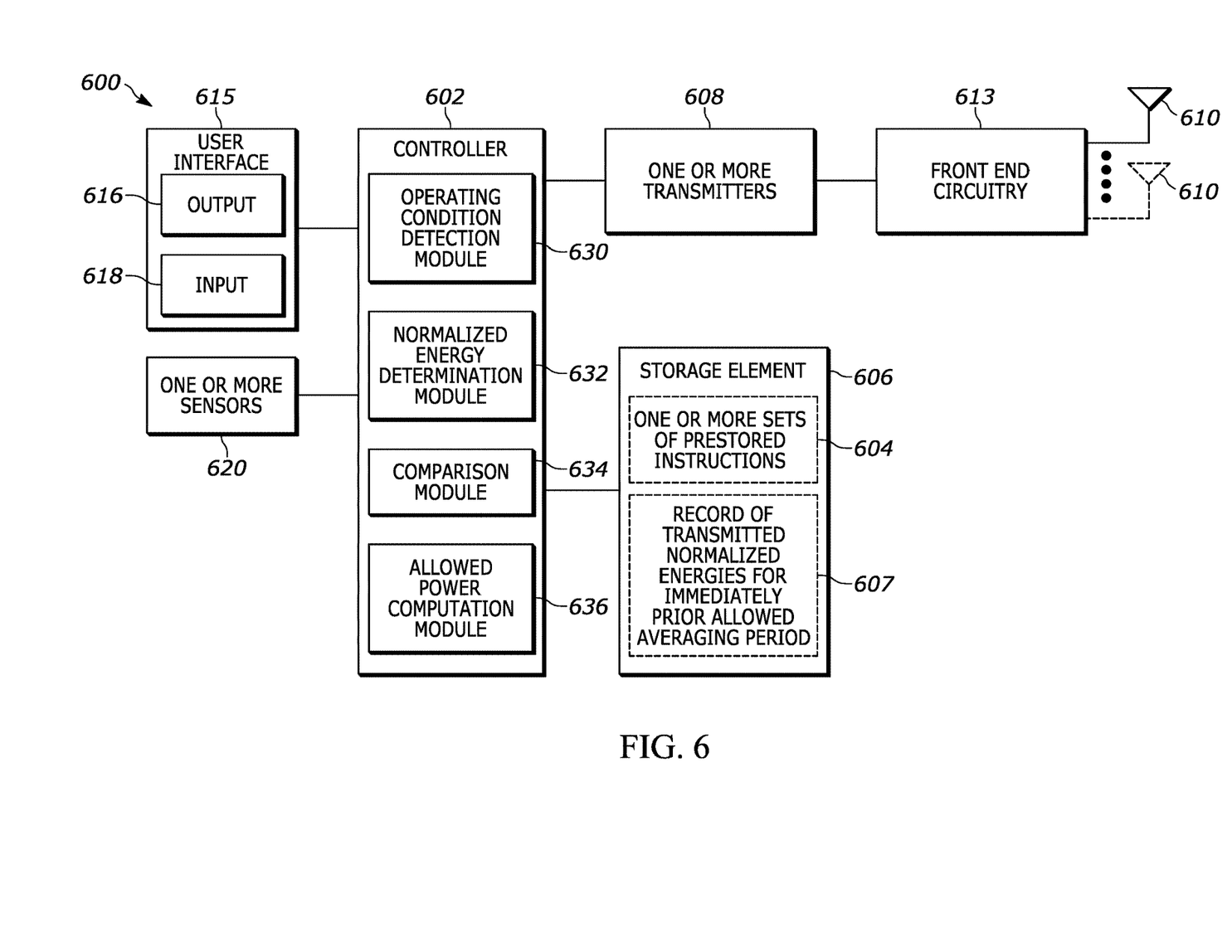
FIG. 6 is a block diagram of an exemplary wireless communication device.

FIG. 6 illustrates a block diagram 600 of an exemplary wireless communication device, in accordance with at least one embodiment. In the illustrated embodiment, the wireless communication device includes a controller 602, which is adapted for managing at least some of the operation of the device. In some embodiments, the controller 602 could be implemented in the form of one or more processors, which can each be adapted to execute one or more sets of pre-stored instructions 604, and which may be used to form or implement the operation of at least part of one or more controller modules including those used to manage wireless communication and/or the management of radio frequency power for energy-based time averaging control.

The one or more sets of pre-stored instructions 604 may be stored in a storage element 606, which while shown as being separate from and coupled to the controller 602, may additionally or alternatively include some data storage capability for storing at least some of the prestored instructions for use with the controller 602, that is integrated as part of the controller 602. The storage element can additionally include a record of transmitted normalized energies for an immediately prior allowed averaging period for each of one or more device operating conditions 607.

The storage element 606 could include one or more forms of volatile and/or non-volatile memory, including conventional ROM, EPROM, RAM, or EEPROM. The possible additional data storage capabilities may also include one or more forms of auxiliary storage, which is either fixed or removable, such as a hard drive, a floppy drive, or a memory card or stick. One skilled in the art will still further appreciate that still other further forms of storage elements could be used without departing from the teachings of the present disclosure. In the same or other instances, the controller 602 may additionally or alternatively incorporate state machines and/or logic circuitry, which can be used to implement at least partially, some of the modules and/or functionality associated with the controller 602 including all or portions of the claimed methods.

In the illustrated embodiment, the controller 602 includes an operating condition detection module 630, that can detect an operating condition of the wireless device. The controller 602 further includes a normalized energy determination module 632, where the normalized energy is determined relative to a monitored energy accumulation over time for each of one or more detected device operating conditions. The controller 602 still further includes a comparison module 634, that compares an amount of already accumulated normalized energy for the detected device operating conditions over an immediately prior window of time. Further yet, the controller 602 includes an allowed power computation module 636, that computes the amount of allowed power to be used during a future sub-period of an upcoming window of time, so as not to exceed an associated limit relative to the overall amount of allowed monitored energy accumulation in each current and upcoming window of time. The controller 602, can include even further modules without departing from the teachings of the present application.

In the illustrated embodiment, the device additionally includes one or more transmitters 608, which can take the form of one or more transceivers, which are coupled to the controller 602 and which serve to manage the external communication of data including their wireless communication using one or more forms of communications. In such an instance, the one or more transmitters 608 will each generally be coupled to one or more antennas 610, via which the wireless communication signals will be radiated and/or received. In the present instance, the one or more transmitters 608 are coupled to the one or more antennas 610 via front end circuitry 613.

The front end circuitry 613 can often include various sub-elements, such as power amplifiers, filters, diplexers, duplexers and switches, which help to facilitate the coupling of a produced signal to an antenna. The front end circuitry 613 can further include impedance matching elements, antenna tuners, and/or additional signal amplifiers, so as to more effectively manage the conveyance of signals between the one or more transmitters 608, and the antenna elements 610.

In the illustrated embodiment, the device can additionally include user interface circuitry 615, some of which can be associated with producing an output 616 to be perceived by the user, and some of which can be associated with detecting an input 618 from the user. For example, the user interface circuitry 615 can include a display 202 adapted for producing a visually perceptible output, which may further support a touch sensitive array for receiving an input from the user. The user interface circuitry may also include a speaker 206 for producing an audio output, and a microphone 208 for receiving an audio input. The user interface output 616 could further include a vibrational element. The user interface input 618 could further include one or more user actuatable switches 204, as well as one or more cameras 210. Still further alternative and additional forms of user interface elements may be possible.

In the illustrated embodiment, the device can still further include one or more sensors 620, which can be used for gathering status information relative to the operating environment as well as the manner in which the device is being used, such as one or more device operating conditions. For example, the one or more sensors 620 can include one or more of tilt sensors and/or proximity sensors, which the device can use to detect the usage orientation, as well as the presence of nearby elements proximate the corresponding sensors, as well as the device in general. In turn, this information can be used to help determine respective limits associated with an overall amount of monitored energy associated with the energy being transmitted by the device, that is allowed to accumulate during the operation of the device over a predetermined window of time. The use of still further types of sensors are possible in identifying use conditions or modes of operation without departing from the teachings of the present application.

While the preferred embodiments have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method in a wireless communication device, the method comprising:
    detecting one or more operating conditions of the wireless communication device, wherein as part of detecting the one or more operating conditions, a power level of a signal being transmitted by the wireless communication device having an associated amount of transmitted energy is detected;
    determining a normalized energy relative to a monitored energy accumulation over time for each of one or more detected device operating conditions, wherein the monitored energy accumulation is associated with but is not equal to the amount of transmitted energy of the signal being transmitted by the wireless communication device, and wherein the normalized energy is a conversion between the power level of the signal being transmitted by the wireless communication device, and the amount of the monitored energy accumulation for each of the one or more detected device operating conditions;
    comparing an amount of already accumulated normalized energy for the detected one or more device operating conditions over an immediately prior window of time; and
    computing an allowed power level to be used for the signal being transmitted by the wireless communication device during a future sub-period of an upcoming window of time, so as not to exceed an associated limit relative to an overall amount of allowed monitored energy accumulation in each current and upcoming window of time.

2. A method in accordance with claim 1, wherein the monitored energy accumulation corresponds to the heat produced in signal transmission circuitry of the wireless communication device.

3. A method in accordance with claim 1, wherein the monitored energy accumulation corresponds to energy associated with the signal being transmitted by the wireless communication device being absorbed into a nearby body.

4. A method in accordance with claim 1, wherein the normalized energy for at least some of the detected device operating conditions are determined as part of a pre-computed modeled effect.

5. A method in accordance with claim 1, wherein the normalized energy for at least some of the detected device operating conditions include a historically determined measured effect relative to each type of signal being transmitted during a particular type of operating condition.

6. A method in accordance with claim 1, wherein the window of time has a duration, which is dependent upon the operating condition of the wireless communication device.

7. A method in accordance with claim 6, wherein the duration of the window of time is dependent upon a frequency of a source of energy responsible for the monitored energy accumulation, wherein the frequency of the source of energy responsible for the monitored energy accumulation being below a predetermined threshold results in a time window having a first duration, and wherein the frequency of the source of energy responsible for the monitored energy accumulation being above a predetermined threshold results in a time window having a second duration, where the second duration is shorter than the first duration.

8. A method in accordance with claim 7, wherein the source of energy responsible for the monitored energy accumulation can include multiple component sources each having a different frequency, wherein when at least one of the respective different frequencies of the multiple component sources is above the predetermined threshold and at least one of the respective different frequencies is below the predetermined threshold, the time window having the shorter second duration is used.

9. A method in accordance with claim 1, wherein the computed amount of allowed power can have a different value between at least some of multiple different sub-periods of a particular one of the windows of time.

10. A method in accordance with claim 1, wherein as part of computing an amount of allowed energy to be used during a future sub-period of an upcoming window of time, an anticipated low energy value is set to a value that corresponds to an amount of power for minimally maintaining an existing connection.

11. A method in accordance with claim 10, wherein as part of computing an amount of allowed energy to be used during a future sub-period of an upcoming window of time, an anticipated high energy value is set to a value that corresponds to an amount of power for a desired portion of the time window to exceed the anticipated low power value without the accumulated normalized energy over an immediately prior window of operation exceeding an allowed limit.

12. A method in accordance with claim 11, wherein when an amount of available energy to be allocated to a future sub-period without exceeding the allowed limit for a new immediately prior window of operation, which includes the future sub-period is less than the low energy value that corresponds to an amount of power for minimally maintaining an existing connection, the amount of available energy to be allocated to the future sub-period is set to zero.

13. A method in accordance with claim 1, wherein an amount of energy used in the future sub-period of the upcoming window of time corresponds to a lesser of the computed amount of allowed power and an amount of energy corresponding to an amount of power, which is desired by an operation of the device during the detected one or more operating conditions.

14. A method in accordance with claim 13, wherein for each of the sub-periods of the immediately prior window of time, the wireless communication device maintains a record of power.

15. A method in accordance with claim 14, wherein the record of power for each of the sub-periods corresponds to an amount of power used.

16. A method in accordance with claim 14, wherein the record of power for each of the sub-periods corresponds to the computed amount of allowed power.

17. A method in accordance with claim 1, wherein during an initial period of operation in a corresponding mode, prior to having an operation history in the corresponding mode of a duration of at least determined desired window of time, in computing the amount of allowed power to be used during a future sub-period, an amount may be reserved so as to allow for a future sub-period to have available an anticipated low power value amount for minimally maintaining an existing connection during the future sub-period.

18. A method in accordance with claim 1, wherein computing the amount of allowed power to be used during the future sub-period of the upcoming window of time uses a predefined prototype waveform, which is tracked using the determined normalized energy based on a presently detected one of the one or more operating conditions.

19. A method in accordance with claim 18, wherein the determined normalized energy will translate to respective power levels that can shift due to differences in the corresponding monitored energy accumulation to normalized energy determination for each of the one or more detected device operating conditions, where the relative relationship between a target energy value, an anticipated low energy value and an anticipated high energy value is the same for each similar type of user interaction with the wireless communication device.

20. A wireless communication device comprising:
a transmitter; and
a controller coupled to the transmitter, the controller including
an operating condition detection module, that detects an operating condition of the wireless communication device, wherein as part of detecting the one or more operating conditions, a power level of a signal being transmitted by the wireless communication device having an associated amount of transmitted energy is detected;
a normalized energy determination module, where the normalized energy is determined relative to a monitored energy accumulation over time for each of one or more detected device operating conditions, wherein the monitored energy accumulation is associated with but is not equal to the amount of transmitted energy of the signal being transmitted by the wireless communication device, and wherein the normalized energy is a conversion between the power level of the signal being transmitted by the wireless communication device, and the amount of the monitored energy accumulation for each of the one or more detected device operating conditions;
a comparison module, that compares an amount of already accumulated normalized energy for the detected one or more device operating conditions over an immediately prior window of time; and
an allowed power computation module, that computes an allowed power level to be used for the signal being transmitted by the wireless communication device during a future sub-period of an upcoming window of time, so as not to exceed an associated limit relative to an overall amount of allowed monitored energy accumulation in each current and upcoming window of time.

\* \* \* \* \*